United States Patent
Wu et al.

[11] Patent Number: 5,964,856
[45] Date of Patent: Oct. 12, 1999

[54] MECHANISM FOR DATA STROBE PRE-DRIVING DURING MASTER CHANGEOVER ON A PARALLEL BUS

[75] Inventors: William S. Wu, Cupertino; Leonard Schultz, San Jose; Dilip K. Sampath; Muthurajan Jayakumar, both of Sunnyvale; Bindi A. Prasad, Los Altos, all of Calif.

[73] Assignee: Intel Corporation, Santa Clara, Calif.

[21] Appl. No.: 08/940,050

[22] Filed: Sep. 30, 1997

[51] Int. Cl.$^6$ .............................. G06F 13/14; G06F 13/00; G06F 1/04
[52] U.S. Cl. .......................... 710/110; 710/107; 710/60; 713/600
[58] Field of Search ................................... 395/287, 290, 395/880, 559; 710/107, 110, 60; 713/600

[56] References Cited

U.S. PATENT DOCUMENTS 5,754,825  5/1998  Hausauer et al. ..................... 395/500
5,802,356  9/1998  Gaskins et al. ....................... 395/555
5,829,026  10/1998 Leung et al. .......................... 711/122

*Primary Examiner*—Ayaz R. Sheikh
*Assistant Examiner*—Tim T. Vo
*Attorney, Agent, or Firm*—Blakely, Sokoloff, Taylor & Zafman LLP

[57] ABSTRACT

In a microprocessor system having a bus clock running at a bus clock rate, a method for reducing an idle interval between a first data transfer and a second data transfer, the method comprising the steps of:

providing a first strobe signal and a second strobe signal for synchronizing said first and second data transfers with the bus clock;

a pre-driving the first strobe signal before the first data transfer, the first strobe signal running at the bus clock rate during the first data transfer; and pre-driving one of the first and second strobe signals before the second data transfer, said one of the first and second strobe signals running at the bus clock rate during the second data transfer.

8 Claims, 10 Drawing Sheets

MECHANISM FOR DATA STROBE PRE-DRIVING DURING MASTER CHANGEOVER ON A PARALLEL BUS

BACKGROUND OF THE INVENTION

1. Field of the Invention

The present invention relates in general to the field of data transfer on a parallel bus, and more particularly, to a mechanism for pre-driving during a master changeover on a parallel bus.

2. Description of Related Art

A multiprocessor system increases system performance because multiple processors operate in parallel. A typical multiprocessor system has a number of processors attached to a common host bus. Although each processor can only use the host bus one at a time, efficient bus protocol has been developed to optimize the host bus utilization.

In such a multiprocessor system, the data bus is the most critical resource because all information and data exchanges take place on the data bus. It is therefore important that the data bus is efficiently utilized. One way to maintain efficient bus utilization is to provide multiple data transfer rates, e.g., a normal transfer rate and a fast transfer rate. The normal transfer rate is typically the rate that is determined by the bus clock. The fast transfer rate, e.g. 2x, is typically a multiple of the normal transfer rate. To accommodate the fast transfer rate, the data transfer is typically clocked by two strobe signals which are phase shifted such that the active edges as provided by both strobes correspond to the fast transfer clock. The problem with this differential approach is that when there is a change in the bus ownership, i.e., when another master takes over the bus, there is a delay of at least two clocks. This two delay clocks, commonly referred to as "dead clocks", reduce the efficiency of the data transfer.

Accordingly, there is a need in the technology to have a mechanism to improve the dead time during master changeover on a parallel bus.

SUMMARY OF THE INVENTION

This invention discloses a method for reducing an idle interval between a first data transfer and a second data transfer in a microprocessor system having a bus clock running at a bus clock rate. The method comprises the steps of:

(1) providing a first strobe signal and a second strobe signal for synchronizing the first and second data transfers with the bus clock; (2) pre-driving the first strobe signal before the first data transfer, the first strobe signal running at the bus clock rate during the first data transfer; and (3) pre-driving one of the first and second strobe signals before the second data transfer, this one of the first and second strobe signals running at the bus clock rate during the second data transfer.

BRIEF DESCRIPTION OF THE DRAWINGS

The advantages of the present invention will become more readily apparent to those ordinarily skilled in the art after reviewing the following detailed description and accompanying drawings, wherein.

DETAILED DESCRIPTION OF THE INVENTION

The present invention discloses a mechanism to pre-drive the data strobes during the master changeover on a parallel bus. The mechanism allows the proper data strobe to be asserted according to the number of the incurred empty or "dead" clock cycles. This mechanism provides for efficient fast data transfer on a parallel bus.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
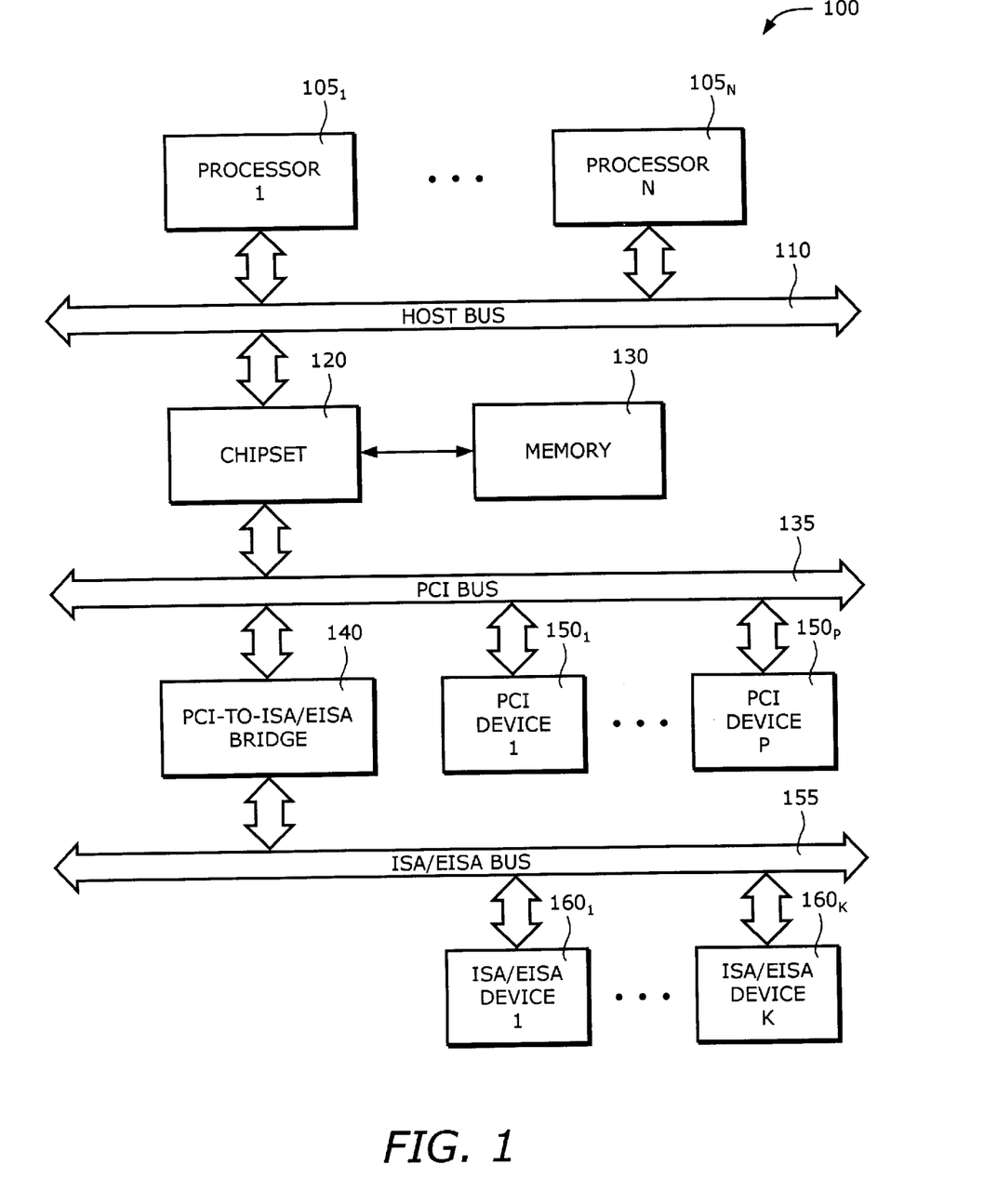
FIG. 1 is a block diagram illustration of one embodiment of a system that operates in accordance with the teachings of the present invention.

Referring to FIG. 1, an illustrative embodiment of a computer system according to one embodiment of the present invention is shown. The computer system 100 comprises one or more processors $105_1$–$105_N$ ("N" being a positive whole number) and a main memory element 130 (e.g., dynamic random access memory "DRAM", static random access memory "SRAM" etc.) coupled together by a host bus 110 and a chipset. In general, the chipset 120 is a host-to-PCI bridge which operates as an interface between a host bus 110 and a peripheral PCI bus 135. The main memory 130 also includes a non-volatile memory or separately powered memory (e.g., DRAM, SRAM) for saving contents of registers or other memories when power is removed.

Processors $105_1$–$105_N$ are any microprocessors that are capable of handling a parallel bus.

Chipset 120 typically includes a cache DRAM controller (CDC), a peripheral bus controller, and a data path unit (DPU). The peripheral bus 135 may comprise a Peripheral Component Interconnect (PCI) bus or any other type of bus architecture. The chipset or Host-to-PCI Bridge 120 provides a set of host-to-PCI and PCI-to-host bus transaction translations.

The host bus 110 is a bus that can support transactions to a number of coupled processors. Host bus 110 may be referred to as a parallel bus or multiprocessor bus because it supports parallel operations and multiple processors. It is contemplated that host bust 110 operates in a pipelined manner to increase efficiency. However, these features should not be construed to limit the teachings of the present invention.

The PCI bus 135 provides a communication path between the processors $105_1$–$105_N$ or main memory element 130 and a plurality of peripheral devices $150_1$–$150_P$ ("P" being a positive whole number). These peripheral devices $150_1$–$150_P$ may include I/O devices such as disk controller, and peripheral components such as DMA controllers, interrupt controllers, and timers.

The PCI-to-ISA Bridge 140 provides the communication path between the peripheral or PCI bus 135 and the expansion or ISA/EISA bus 155.

The ISA/EISA bus 155 provides a communication path between the peripheral PCI bus 135 and a plurality of expansion ISA/EISA peripheral devices $160_1$–$160_K$ ("K" being a positive whole number). The expansion ISA/EISA peripheral devices $160_1$–$160_K$ may include any suitable devices such as DMA controllers, interrupt controllers and programmable timers. The expansion bus 155 may comprise an Industry Standard Architecture (ISA) bus or an Extended Industry Standard Architecture (EISA) bus.

TERMINOLOGY

A bus agent is any device that sits on the system bus including the processors themselves. Agents wishing to issue transactions on the request bus can be of two types.

Symmetric Agent. Agents that arbitrate for the request bus using symmetric round robin arbitration. This is usually the processors.

Priority Agent. Agents that arbitrate for the request bus using the priority mechanism. This is usually the I/O Agent.

A particular bus agent can have one or more of several roles in a transaction.

Requesting Agent. The agent that issues the transaction. This is always a symmetric or priority agent.

Addressed Agent. The agent that is addressed by the transaction. Also called the Target Agent. This can be any classification of agent. A memory or I/O transaction is addressed to the memory or I/O agent that recognizes the specified memory or I/O address. A Deferred Reply transaction is addressed to the agent that issued the original transaction. Interrupt transactions are addressed to processors. Special transactions are considered to be issued to the central agent.

Deferring Agent. The agent that chooses to defer a transaction and accepts responsibility for the transaction. This is typically the addressed agent, and usually the I/O or memory agent.

Snooping Agent. A caching bus agent that observes ("snoops") bus transactions to maintain cache coherency. Usually a snooping agent is a processor or a DMA device.

Responding Agent. The agent that provides the response on the RS[2:0]# signals to the transaction. Typically the addressed agent. This is always the memory, I/O, or central agent.

Each transaction has several phases that include some or all of the following phases.

Arbitration Phase. No transactions can be issued until the bus agent owns the bus. A transaction only needs this phase if the agent that wants to issue the transaction does not already own the bus. There is a distinction between a symmetric bus owner and the actual bus owner. The symmetric bus owner is the bus owner unless the Priority Agent owns the bus.

Request Phase . This is the phase in which the transaction is actually issued to the bus. The requesting agent asserts ADS# and the address in this phase. All transactions must have this phase.

Error Phase Any errors that occur during the Request Phase are reported in the Error Phase. All transactions have this phase (1 clock).

Snoop Phase. This is the phase in which cache coherency is enforced. All caching agents (snooping agents) assert HIT# and HITM# to appropriate values in this phase. All transactions have this phase.

Response Phase . The response agent asserts the transaction response during this phase. The response agent is the target device addressed during the Request Phase unless the transaction is a Deferred Reply or an Interrupt. All transactions have this phase.

Deferred Phase . The deferring agent may complete a deferred transaction during this phase. Not all transactions have this phase.

Data Phase . The response agent asserts or accepts the transaction data, if there is any. Not all transactions have this phase.

Other commonly used terms include:

A request initiated data transfer means that the requesting agent has write data to transfer. A request initiated data transfer has a request initiated TRDY# assertion.

A response initiated data transfer means that the response agent provides the read data to the requesting agent.

A snoop initiated data transfer means that there was a hit to a modified line during the snoop phase, and the agent that asserted HITM# is going to drive the modified data to the bus. This is also called an implicit writeback because every time HITM# is asserted, the addressed memory agent knows that writeback data will follow. A snoop initiated data transfer has a snoop initiated TRDY# assertion.

Signal/Diagram Conventions

Signal names use uppercase letters, such as ADS#. Signals in a set of related signals are distinguished by numeric suffixes, such as AP1 for address parity bit 1. A set of signals covering a range of numeric suffixes is denoted as AP[1:0]#, for address parity bits 1 and 0. A # suffix indicates that the signal is active low. No # suffix indicates that the signal is active high.

In many cases, signals are mapped one-to-one to physical pins with the same names. In other cases, different signals are mapped onto the same pin. For example, this is the case with the address pins A[43:3]#. During the first clock of the Request Phase, the address signals are asserted. The first clock is indicated by the lower case a, or just the pin name itself: Aa[43:3]#, or A[43:3]#. During the second clock of the Request Phase other information is asserted on the request bus. These signals are referenced either by their functional signal names DID[7:0]#, or by using a lower case b with the pin name: Ab[23:16]#. Note also that several pins have configuration functions at the asserted to deasserted edge of RESET#.

The term "asserted" denotes that a signal is driven to its active level (logic 1, LINTO high, or ADS# low). The term "deasserted" denotes that a signal is driven to its inactive level (logic 0, LINTO low, or ADS# high).

In timing diagrams, square and circle symbols indicate the clock in which particular signals of interest are driven and sampled. The square indicates that a signal is driven in that clock. The circle indicates that a signal is sampled in that clock. Black bars indicate zero or more clocks are allowed.

All timing diagrams in this specification show signals as they are asserted or deasserted. There is a one-clock delay in the signal values observed by system bus agents. Upper case letters that appear in brackets represent a group of signals such as the Request Phase signals {REQUEST}. The timing diagrams sometimes include internal signals to indicate internal states and show how it affects external signals. Internal states change one clock after sampling a bus signal. A bus signal is sampled one clock after the bus signal is driven.

When signal values are referenced in tables, a 0 indicates deasserted and a 1 indicates asserted. 0 and 1 do not reflect voltage levels. Remember, a # after a signal name indicates active low. An entry of 1 for ADS# means that ADS# is asserted, with a low voltage level. When signal arrays are mentioned in text, 00B refers to a two bit array with both bits 0.

Figure 2:
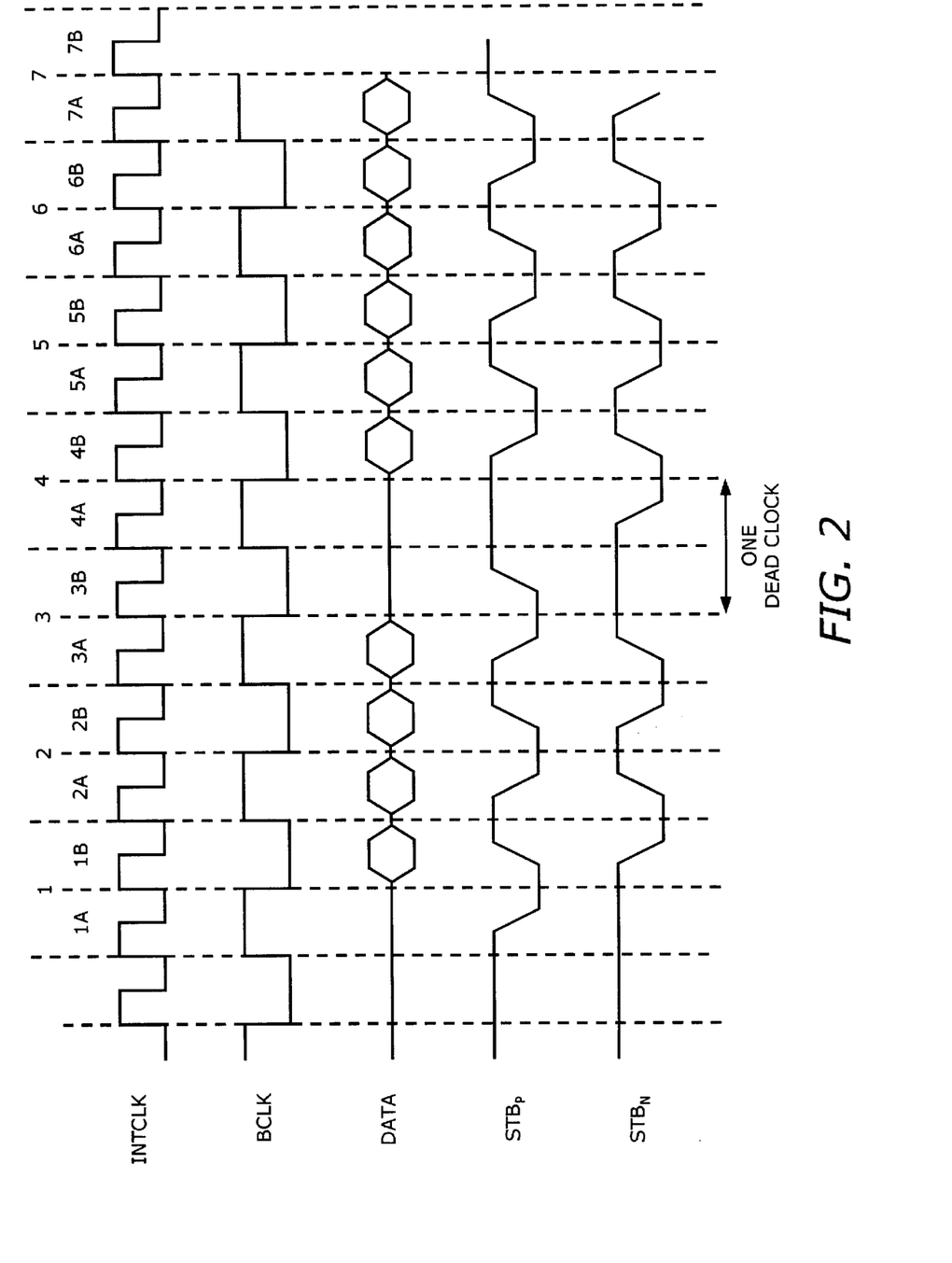
FIG. 2 is a timing diagram illustrating the master changeover in one dead clock.

Referring to FIG. 2, a timing diagram illustrating the data transfer with one dead clock cycle is shown. A dead clock cycle is a clock cycle dummy which there is no data transfer.

The INTCLK is the representative clock internal to the processor that is used to synchronize other signals and clock the data on the data bus. The INTCLK is shown to illustrate the relationship among the various signals. The BCLK is the clock as seen on the bus and is typically synchronized with the INTCLK in some fashion. In this embodiment, the INTCLK is twice faster than the BCLK. The DATA is the data as seen on the bus. In the embodiment as illustrated in FIG. 2, the DATA is transferred at twice the normal transfer rate. As shown in FIG. 2, the data is synchronized with the positive going edge of the INTCLK. When data is not driven by any of the bus agents, it become high impedance and is shown floating as from INTCLK 1A, 3B and 4A in FIG. 2.

STBp and STBn are two strobe signals that are use to drive the data onto the bus. STBp and STBn synchronize the transfer of data with the BCLK. Any receiving bus agent can use STBp and STBn to latch the data. The use of two strobe signals (instead of one) for strobing data eliminates the jittering problem associated with single strobe approach. Another advantage of why two strobe signal is to reduce the common mode signal noise problem. Furthermore, it is difficult to clock the data on the bus at a rate twice faster than the bus clock with only one strobe.

STBp and STBn are phase shifted from each other although the phase shifting does not occur at all clocks. By shifting the phase, i.e., shifting the edge of one signal by an amount equal to half the BCLK the receiver can examine both STBp and STBn to obtain the data. The consequence of the phase shift is that the DATA is valid when there are transitions at both STBp and STBn. It does not matter which one of STBp and STBn is positive-going or negative-going.

To have this complementary edge feature, one of the data strobe signals is asserted before the data is actually strobed. Typically, this assertion is one clock before the data is available. This early assertion is referred to as "pre-drive". Thereafter in the next clock, the other data strobe is asserted at the instant when the pre-drive data strobe toggles. With this pre-drive feature, two data strobes form a pair of complementary edges at the time the data itself is available. From there on, the two data strobes toggle in the normal process corresponding to the data.

Thus, by providing the edge-complementary data strobe with pre-drive, a faster transfer rate is achieved. In FIG. 2, the internal clock is twice faster than the bus clock. With pre-drive dual data strobe, the data can be transferred at twice the normal rate: two data are available in one bus clock.

In a multiprocessor environment where the data bus is shared by a number of processors, any processor may request the use of the bus. If the arbitration phase become successful, there will be a master changeover to allow the requesting processor to become the bus master. Typically, there will be some delay between the last data drive by the previous processor and the first data driven by the current processor. A period of one clock cycle of this delay is referred to as a "dead clock". This delay caused by the master changeover typically lasts two clocks in this dual strobe environment. In other words, two dead clocks are normally required during master changeover. To reduce the number of dead clocks during master changeover, a ping-pong policy is used. This policy is explained in the following.

In FIG. 2, the two strobe signals STBp and STBn clock the data at twice the clock rate of the BCLK. The DATA is available during the second half of BCLK 1, or during INTCLK 1B. STBp is pre-driven at INTCLK 1A. At INTCLK 1B, STBp goes high while STBn is driven low. STBp and STBn continue to toggle each at the rate of bus clock.

At INTCLK 3B, the data transfer of the block initiated by the STBp is terminated. The next data transfer can take place after one dead clock covering INTCLK 3B and INTCLK 4A. STBn now pre-drives the data at INTCLK 4A. Then, STBn will toggle at INTCLK 4B at the same instant when STBp toggles at clock 4B, starting the clocking of data in the next data transfer. By switching the role of the two data strobes in a ping-pong manner, it is now possible to keep the data transfers with only one dead clock during master changeover.

Figure 3:
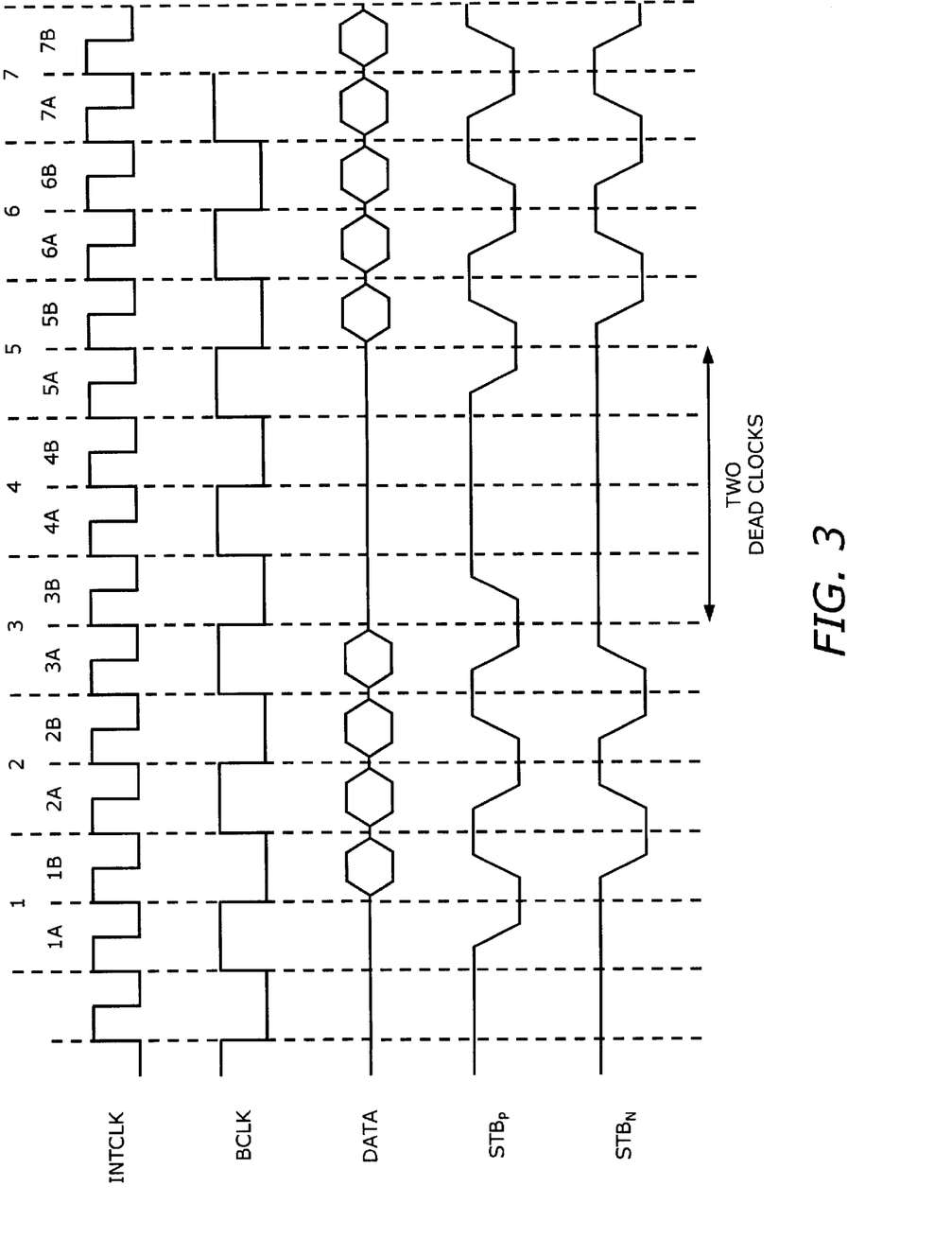
FIG. 3 is a timing diagram illustrating the master changeover in two dead clocks.

Referring to FIG. 3, a timing diagram illustrating the data strobes in two dead clocks is shown.

At INTCLK 3B, the data transfer for the block initiated by STBp is terminated. In the example shown in FIG. 3, there are two dead clocks. Therefore, there is more time for the signal to settle. In this case, the STBp signal will be used again to pre-drive the data for the next data transfer in INTCLK 5A. At clock 5B, STBp toggles at the same time with STBn going low, effectuating a clocking of data. The process then continues as before.

When the time between the two data transfers is more than one dead clock, there is no need to apply the ping-pong policy because there is enough time for the signal to settle. When the time between the two data transfers is one dead clock, the two data strobe signals STBp and STBn reverse the role to pre-drive the data. This policy applies whether or not there is a master changeover.

FIGS. 4 through 10 show timing diagrams for various transactions at the 2X data transfer rate during the data phase. Before discussing these figures, the following discussion illustrates the Data phase.

Data Phase Overview:

During the Data Phase, data is transferred between different bus agents. Data transfer responsibilities are negotiated between bus agents as the transaction proceeds through various phases.

Based on the Request Phase, a transaction either contains a request initiated (write) data transfer, a response initiated (read) data transfer, or no data transfer. On a modified hit during the Snoop Phase, a snoop initiated data transfer may be added to the request or substituted for the response initiated data transfer. On a deferred completion response in the Response Phase, response initiated data transfer is deferred.

There are two different data transfer rates: 2x transfer rate (fast transfer rate) and 1x transfer rate (bus clock transfer rate).

Bus Signals:

The signals driven in this phase by agents which use the 2x transfer rate are D[63:0]#, DEP[7:0]#, DRDY#, DBSY#, SBSY#, STBp[3:0]#, and STBn[3:0]#. Data is transferred on two consecutive half clocks in the 64 bit data bus with source synchronous strobes. Data is always transferred in 128 bit multiples, even if less data is requested. The signals are bused.

The signals driven in this phase by agents which use the 1x transfer rate are DRDY#, DBSY#, D[63:0]# and DEP [7:0]# These signals are bused.

Data Phase Protocol Rules:

Valid Data Transfer:

A valid data transfer sends data and ECC from a sender to a receiver. It has a minimum length which is a function of the data width and signaling protocol. This is not necessarily the same as the data transfer length requested in the Request Phase.

All Data Phase bus signal; DRDY#, D[63:0]#, DEP[7:0]# and DBSY# are driven by the agent responsible for data transfer.

With 1x transfer rate data transfers, a valid data chunk on D[63:0]# and ECC on DEP[7:0]# is indicated by DRDY# assertion in that clock.

With 2x transfer rate data transfers, a valid data chunk on D[63:0]# and ECC on DEP[7:0]# is indicated by the difference of STBp[3:0]# and STBn[3:0]#. Valid data transfers at 2x transfer rate always occur in 128 bit multiples. STBp[3:0]# xor STBn[3:0]# must be predriven before the data transfer. Strobes will not toggle for invalid 128 bit data. All strobes in each array are copies which toggle together. The receiver is made aware of valid data transfer by DRDY# assertion in that clock.

Data transfers with multiple DRDY# assertions begin with assertion of DBSY# and may complete with deassertion of DBSY# no sooner than one clock prior to the last DRDY# assertion. Data transfers with a single DRDY# assertion are not required to assert DBSY#.

Data transfers at the 1x transfer rate do not assert SBSY#, STBp[3:0]#, or STBn[3:0]#. Data transfers at the 2x transfer rate assert SBSY# at least one clock before DRDY#. SBSY# is deasserted no sooner than two clocks prior to the last DRDY# assertion. Data transfers with one or two DRDY# assertions may deassert SBSY# the clock after SBSY# assertion.

Request Initiated Data Transfer:

When a write request is initiated during the Request Phase of the transaction, the transaction contains a request initiated data transfer. The request agent will not send any data in response to TRDY# if the transaction length is zero. Request initiated data transfer for transaction "n" begins only after transaction "n" reaches the top of the In-order Queue. The clock after TRDY# is sampled asserted and DBSY# is sampled deasserted (and AERR# is sampled deasserted in the Error Phase), the requesting agent may begin Valid Data Transfer.

SBSY# may be driven and strobes predriven the clock after TRDY# is sampled asserted and SBSY# is sampled deasserted.

The requesting agent may also begin Valid Data Transfer on the same clock TRDY# is sampled asserted, and DBSY# and/or SBSY# is sampled deasserted, if it can predict this even one cycle earlier. This only occurs when the requesting agent creates the event by driving the Valid Data Transfer for the previous transfer.

Snoop Initiated Data Transfer:

When HITM# is asserted during the Snoop Phase of the transaction, the transaction contains snoop initiated data transfer. On the first clock after TRDY# is sampled asserted for the snoop initiated data transfer and DBSY# is sampled deasserted, the snooping agent asserts DBSY# and may begin Valid Data Transfer.

SBSY# may be driven and strobes predriven the clock after TRDY# is sampled and SBSY# is sampled deasserted.

Response Initiated Data Transfer:

When HITM# is sampled deasserted during the Snoop Phase and the Request Phase contains a request for read data, the transaction contains response initiated data transfer.

The responding agent can being Valid Data Transfer (as defined above) when it is ready to return data. It begins Valid Data Transfer and RS[2:0]# assertion to Normal Data Response in the same clock.

SBSY# may be driven and strobes predriven the clock after SBSY# is sampled deasserted.

Response initiated data transfer may begin on the same clock DBSY# and/or SBSY# is sampled deasserted if it can predict this event one cycle earlier. This only occurs when the responding agent creates the event by deasserting DBSY# and SBSY# for the previous data transfer while the responding agent is asserting the response initiated data transfer.

No Data Transfer:

A data phase may occur without valid data transfer. The data phase signal DBSY# can be asserted by the responding agent if the system is not driving TRDY# and DBSY# and TRDY# are sampled deasserted. The responding agent can begin Valid Data Transfers when it is ready to return data, or it can deassert DBSY# to release the data bus to another agent.

SBSY# may be driven and strobes predriven if the system is not driving TRDY# and DBSY# and TRDY# are sampled deasserted. Strobes are predriven before SBSY# deassertion releases the strobe bus.

Strobe Phase Shift:

Strobes shift phase when one idle clock exists between data phases. The previous data transfer indicates when strobe phase shift is required on SBSY# and DBSY#.

SBSY# is deasserted one clock before DBSY# is deasserted for line transfers.

SBSY# may be deasserted the same clock DBSY# is deasserted for partial transfers.

The next data transfer knows to shift phase by sampling SBSY# and DBSY#.

If SBSY# is sampled deasserted and DBSY# is sampled asserted, SBSY# assertion in the next clock requires strobe phase shift by predriving the strobe array the previous data transfer did not predrive.

If SBSY# and DBSY# are sampled deasserted, SBSY# assertion in the next clock requires strobes predrive STBp[3:0]#.

Data transfer may begin on the same clock DBSY# and/or SBSY# is sampled deasserted if it can predict this event one cycle earlier. This only occurs when the agent transferring data creates the event by deasserting DBSY# and SBSY# for the previous data transfer while preparing to drive the next data transfer on the next clock.

If SBSY# is sampled deasserted and DBSY# is sampled asserted, SBSY# assertion in the same clock requires no strobe phase shift and no predrive. The data transfer continues with the same strobe array the previous data transfer predrove.

Figure 4:
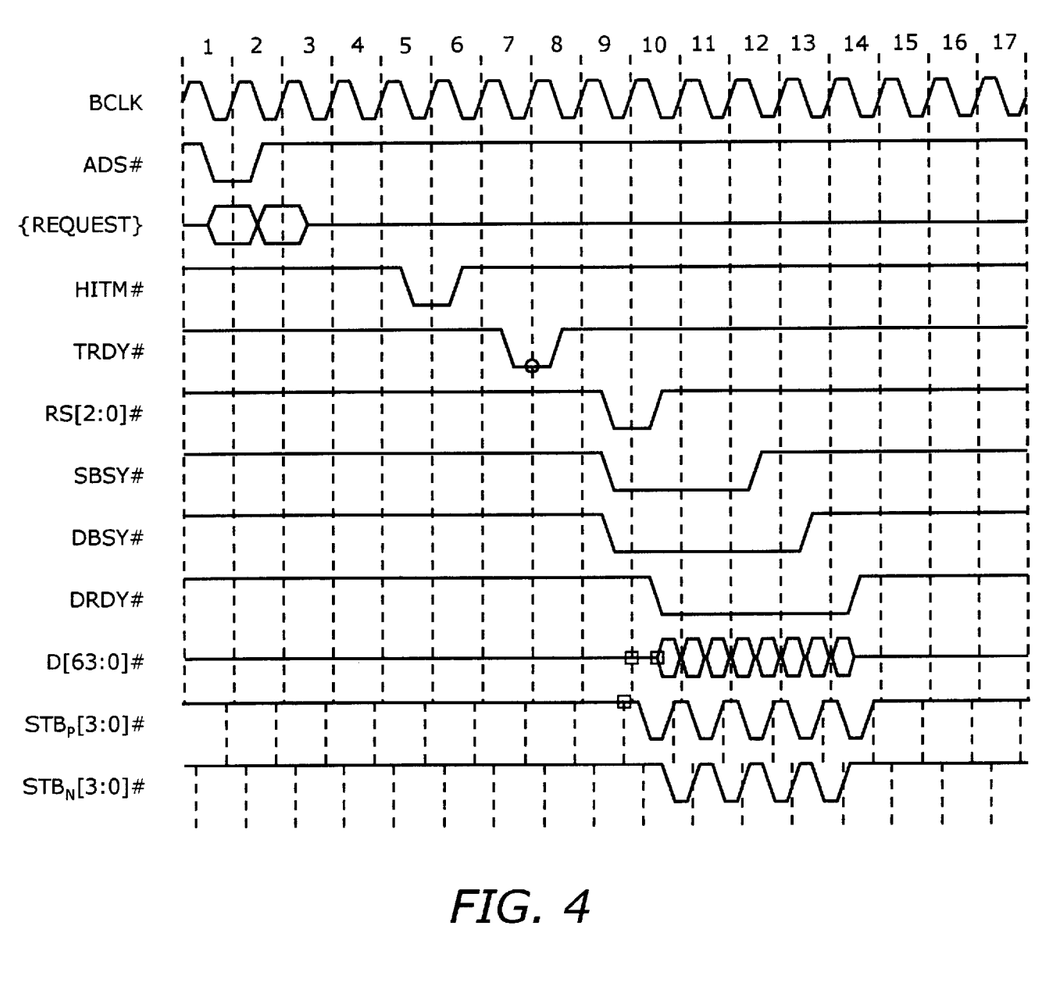
FIG. 4 is a timing diagram illustrating a 64-byte read with implicit writeback.

Referring to FIG. 4, a timing diagram illustrating a 64-byte read with implicit writeback is shown.

In this example the requesting agent asserts ADS# in T1 to initiate a read 64 Byte transaction. In T2, the requesting agent asserts LEN[1:0]#=11B to indicate a 64-byte length. During the snoop phase in T5 HITM# is asserted by the snooping agent.

In T7 the responding agent asserts TRDY# to indicate that it is ready to accept write data. In T8 the snooping agent samples TRDY# asserted with deasserted DBSY#.

In T9 the snooping agent begins the data phase by asserting DBSY# and SBSY#. The snooping agent predrives STBp[3:0]# at the 75% point of T9.

The snooping agent begins valid data transfer by asserting DRDY# and driving valid data on D[63:0]# on the rising edge and at the 50% point of BCLK between T10 and T13. Two chunks of data are driven onto the bus in one clock period. The snooping agent drives a rising and falling edge on both STBp[3:0]# and STBn[3:0]# at the 25% and 75% point of BCLK between T10 and T13 (the center of each data transfer). The snooping agent drives a rising edge on STBp[3:0]# at the 25% point of T14 to turn the bus over to the next agent.

At most one clock after the snooping agent drives the strobes, the centered strobes arrive at the requesting and responding agents to capture the data. With each arriving strobe pair, a new chunk of data is captured into the requesting and responding agent's buffers. Sometime later, the requesting agent and responding agent latch the data into the BCLK# domain. In T11 the requesting and responding agents sample DRDY# and know that data has been sent.

Figure 5:
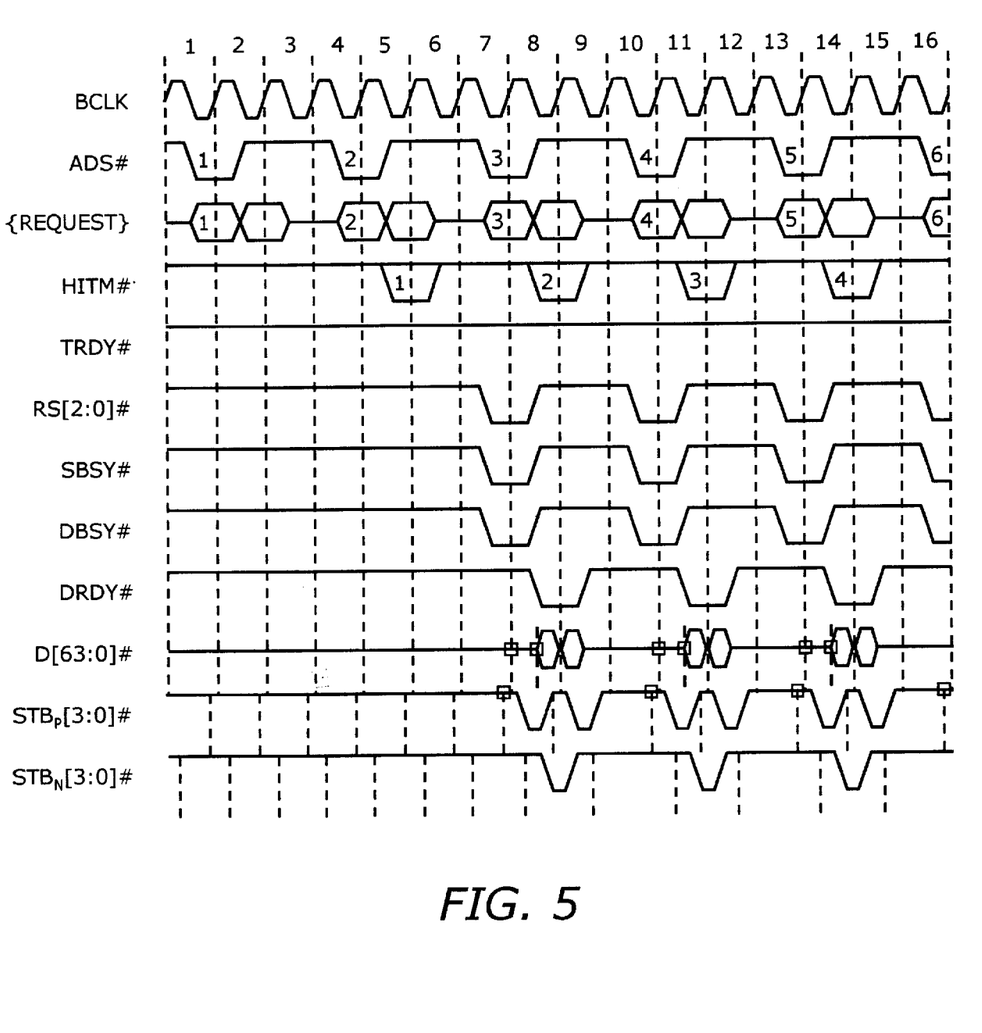
FIG. 5 is a timing diagram illustrating consecutive read partial transactions.

Referring to FIG. 5, a timing diagram illustrating consecutive read partial transactions is shown. FIG. 5 shows steady-state behavior with consecutive Read Partial Transactions. DBSY# is asserted since the single chunk is transferred late due to strobe predrive. Note that there are no bottlenecks to maintaining this steady-state. Two chunks are sent even though only one may be requested.

The strobes for the consecutive data transfers do not shift phase. The responding agent samples SBSY# deasserted and DBSY# deasserted (T9, T12, T15) and determines that the positive strobes must be used to start the data phase. The responding agent predrives STBp[3:0]# at the 75% point of T10, T13, and T16.

Figure 6:
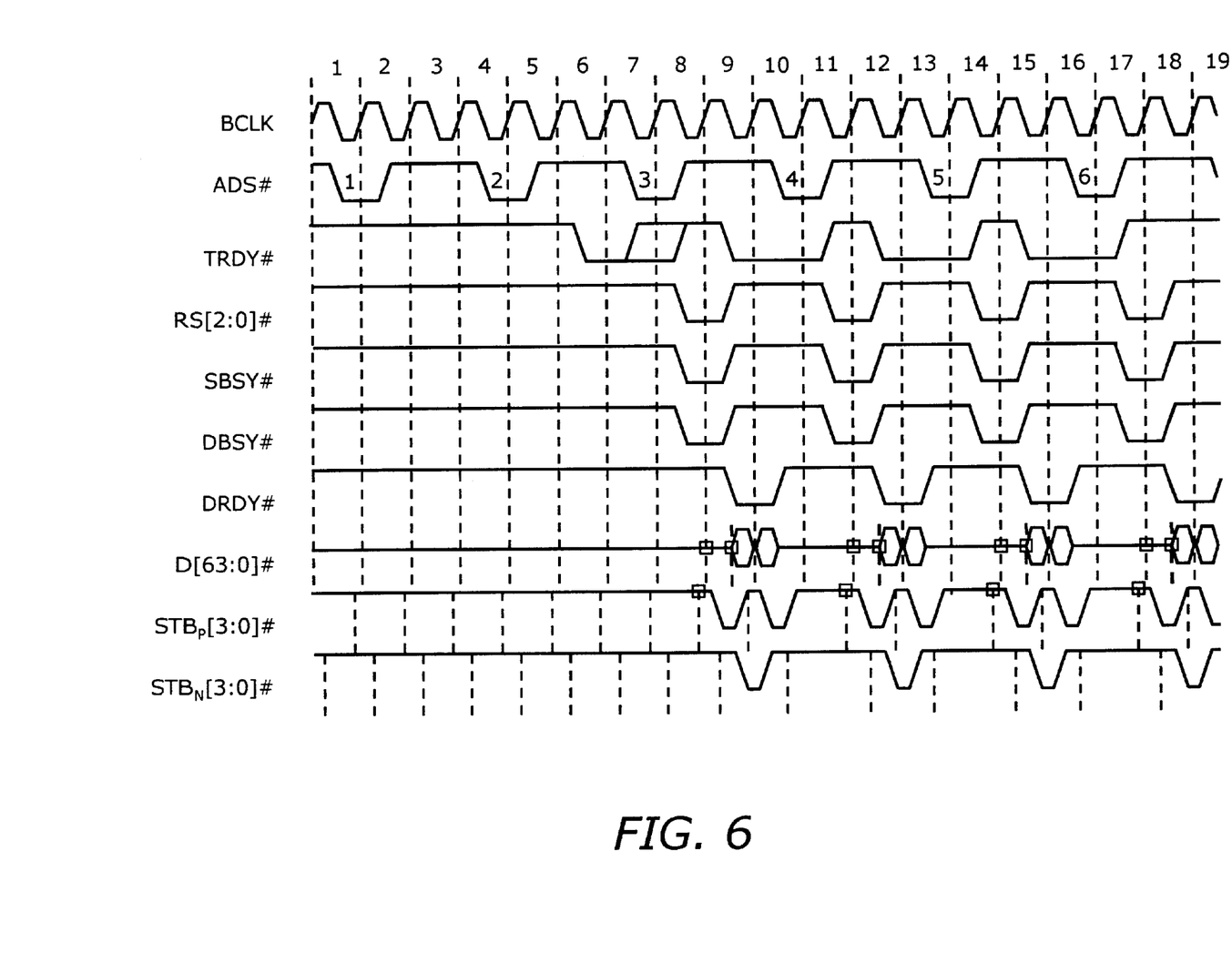
FIG. 6 is a timing diagram illustrating consecutive write partial transactions.

Referring to FIG. 6, a timing diagram illustrating consecutive write partial transactions is shown. FIG. 6 shows steady-state behavior with consecutive Write Partial Transactions, with data transfers to the same addressed agent. Data transfers may occur every 3 clocks only if sent to the same agent. Note that there are no bottlenecks to maintaining this steady-state. Two chunks are sent even though only one may be requested.

TRDY# for transaction 2 can be asserted the cycle after RS[2:0]# is asserted, if RS[2:0]# and TRDY# both come from the same agent.

The strobes for the consecutive data transfers do not shift phase. The requesting agent samples SBSY# deasserted and DBSY# deasserted (T10, T14 T17, T21) and determines that the positive strobes must be used to start the data phase. The requesting agent predrives STBp[3:0]# at the 75%, point of T11, T15, T18 and T22.

Figure 7:
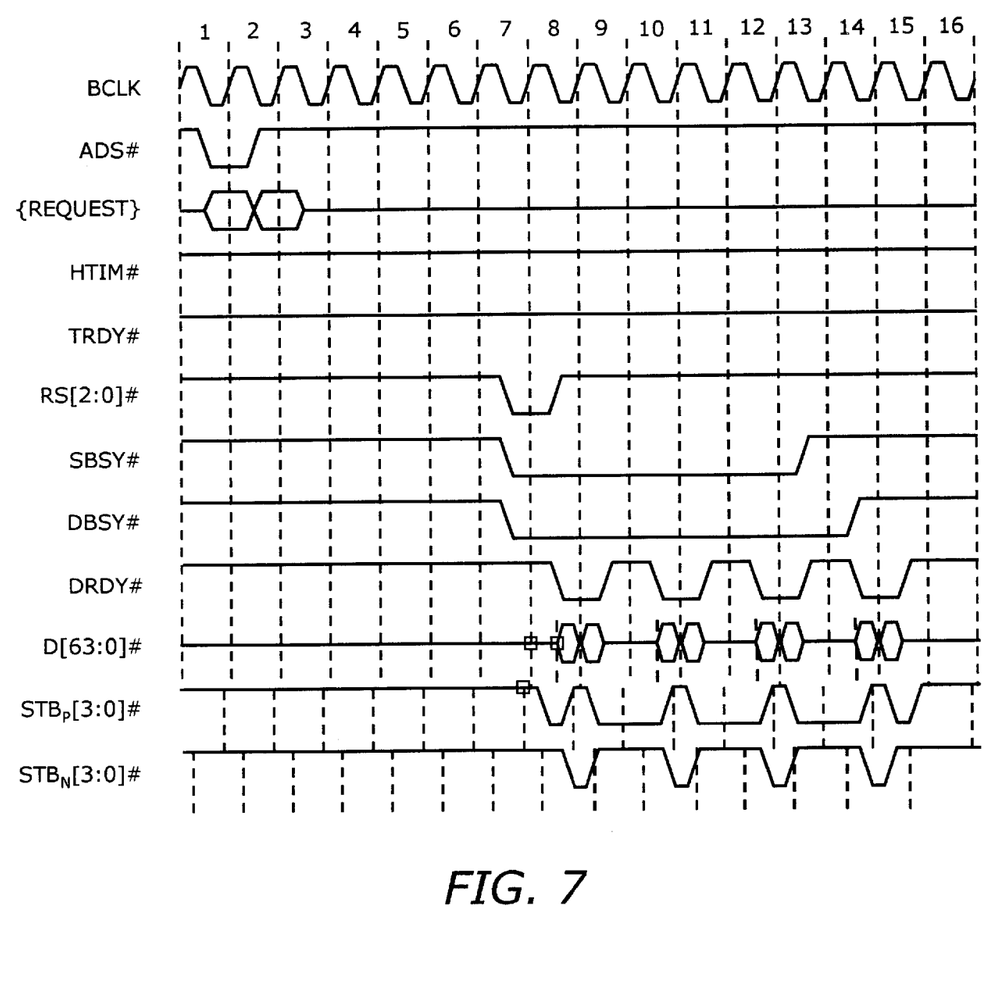
FIG. 7 is a timing diagram illustrating wait states.

Referring to FIG. 7, a timing diagram illustrating wait states is shown. FIG. 7 shows a simple 64 Byte read transaction with wait states added into the data transfer by the deassertion of DRDY#.

A transaction is issued to the bus in T1. A read request being initiated indicates that the transaction does not have write data to transfer. The snoop results asserted in T5 indicate a miss.

The data phase begins in T7 with the assertion of RS[2:0] #, SBSY#, DBSY# and predrive of STBp[3:0]#. The data transfer begins in T8, with the assertion of DRDY#, DBSY#, and valid data.

DBSY# stays asserted until the clock before the last data transfer to indicate that more data is coming. SBSY# stays asserted until two clocks before the last data transfer to indicate that the strobe bus is still in use. DRDY# is asserted by the responding agent to indicate that it has asserted valid data. To insert wait states into the data transfer, DRDY# is deasserted.

STBp[3:0]# and STBn[3:0]# do not toggle for invalid data (DRDY# deasserted).

Figure 8:
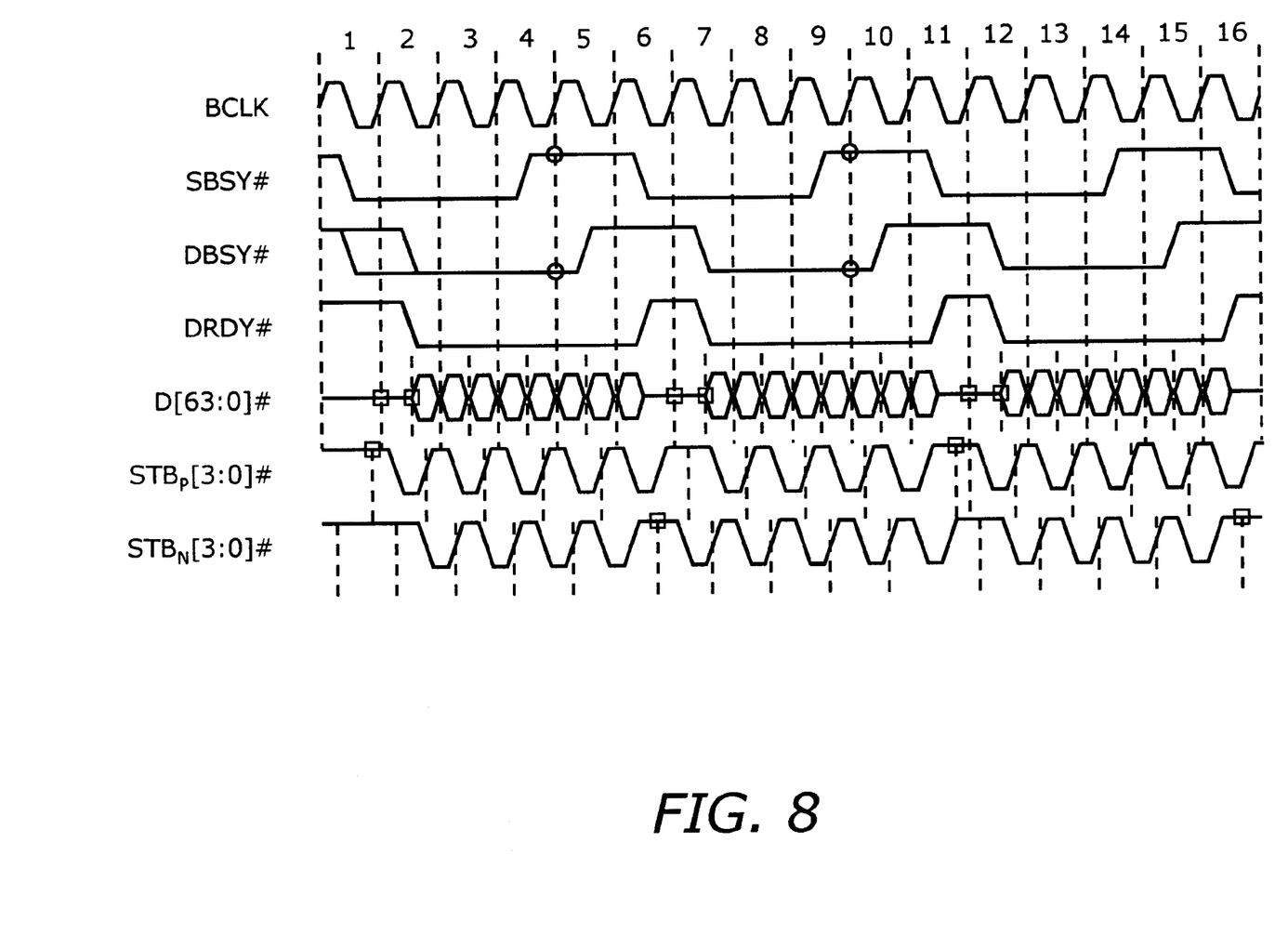
FIG. 8 is a timing diagram illustrating the strobe phase shift.

Referring to FIG. 8, a timing diagram illustrating the strobe phase shift is shown. FIG. 8 shows the strobe signals shifting phase. Because there is only one dead clock, the next data transfer agent predrives the strobe array that the previous data transfer did not pre-drive.

The first data transfer occurs using STBp[3:0]#. In T5, the next data transfer agent samples SBSY# deasserted and DBSY# asserted, indicating that predrive in the next clock requires a phase shift. In T6, because STBp[3:0]# was pre-driven in T1, the next data transfer agent pre-drives on STBn[3:0]#. Notice that the 75% point of T6 has moved to STBn[3:0]#.

In T10, the next data transfer agent samples SBSY# deasserted and DBSY# asserted, indicating that pre-drive in the next clock requires a phase shift. In T11, the next data transfer agent pre-drives strobes. Because STBn[3:0]# was predriven in T6, predrive in T11 requires the predrive to occur on STBp[3:0]#. Notice that the 75% point of T11 has moved back to STBp[3:0]#.

Figure 9:
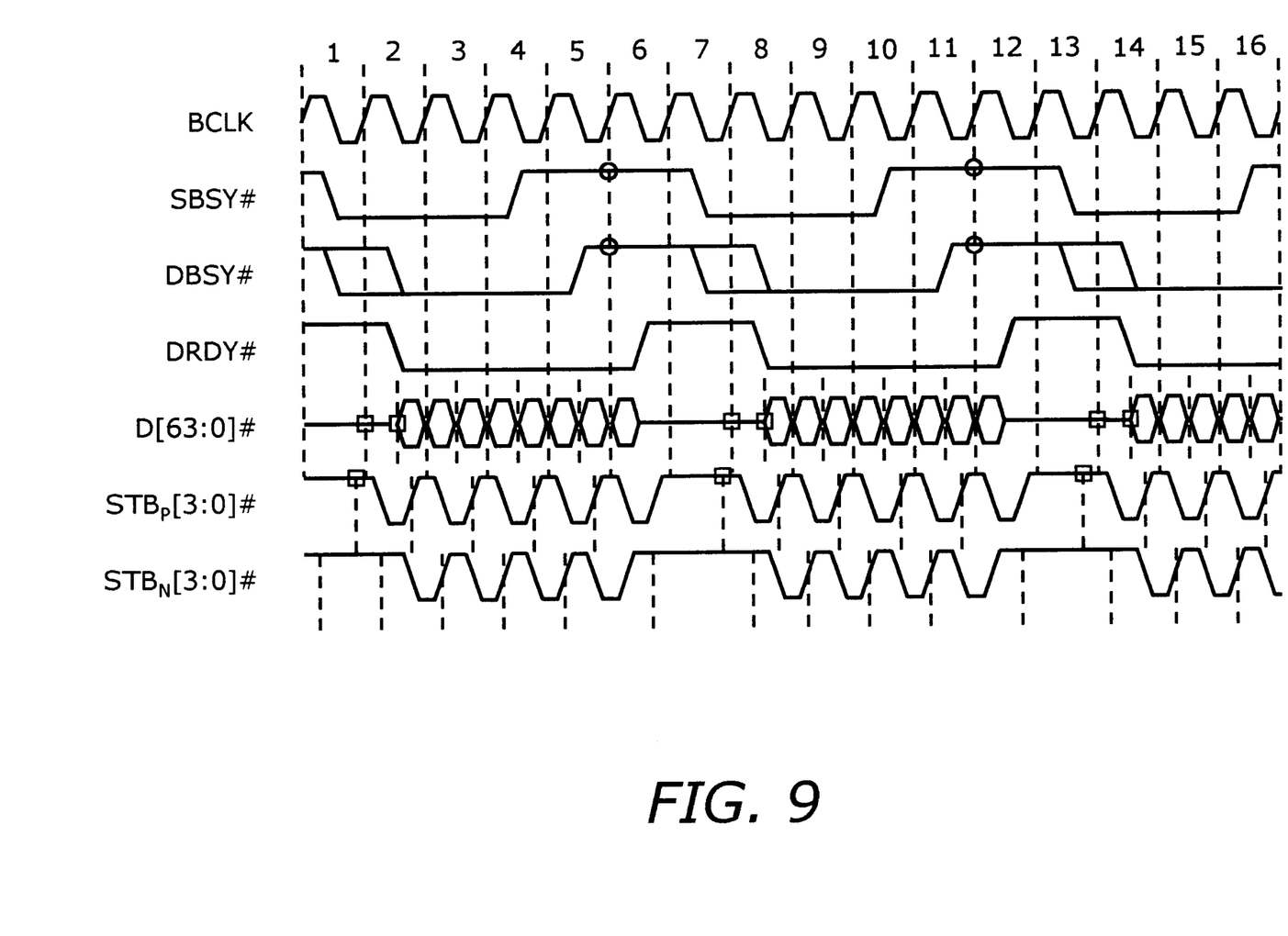
FIG. 9 is timing diagram illustrating two dead-clock without phase shift.

Referring to FIG. 9, a timing diagram illustrating two dead-clock without phase shift is shown. FIG. 9 shows no phase shift. Because there are two dead clocks, predrive uses STBp[3:0]#.

The first data transfer occurs using STBp[3:0]#. In T6, the next data transfer agent samples SBSY# deasserted and DBSY# deasserted, indicating that predrive in the next clock must use STBp[3:0]#. In T7, the next data transfer agent predrives on STBn[3:0]#. Notice that the 75% point of T6 is STBn[3:0]#, but the 75% of T7 moved back to STBp[3:0]#.

Figure 10:
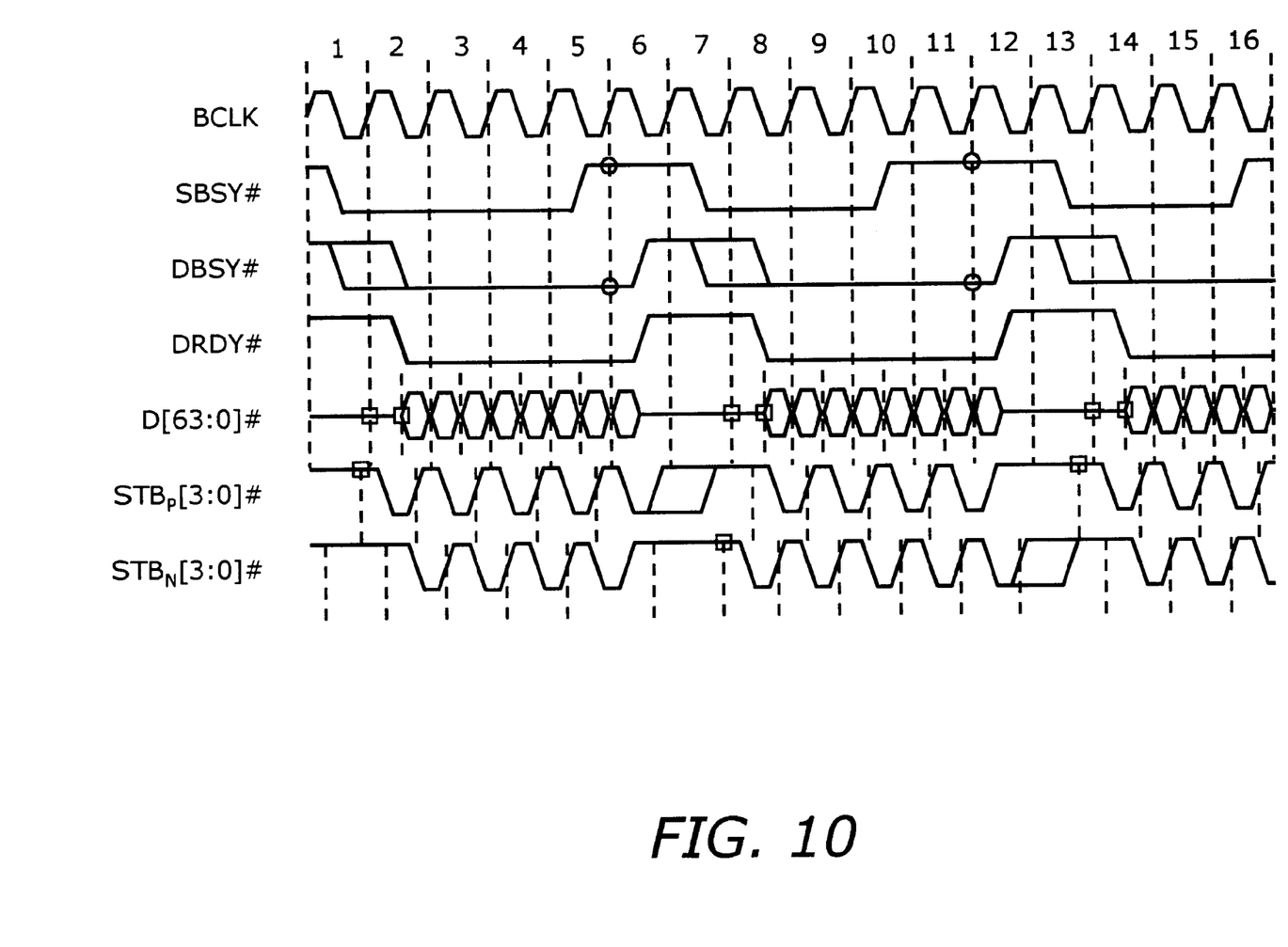
FIG. 10 is a timing diagram illustrating the relaxed SBSY# and DBSY# de-assertion.

Referring to FIG. 10, a timing diagram illustrating the relaxed SBSY# and DBSY# de-assertion is shown. FIG. 10 shows relaxed SBSY# and DBSY# deassertion. SBSY# and DBSY# may be left asserted beyond the optimal point. The strobe bus is released two clocks after SBSY# is deasserted. The data bus is released one clock after DBSY# is deasserted. The next data transfer shifts phase if SBSY# is sampled deasserted and DBSY# is sampled asserted.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. In a microprocessor system having a bus clock running at a bus clock rate, a method for reducing an idle interval between a first data transfer and a second data transfer, the method comprising the steps of:

providing a first strobe signal and a second strobe signal for synchronizing said first and second data transfers with the bus clock, the first and second strobe signals clocking data in the first and second data transfers, respectively;

pre-driving the first strobe signal before the first data transfer, the first strobe signal running at the bus clock rate during the first data transfer; and pre-driving one of the first and second strobe signals before the second data transfer, said one of the first and second strobe signals running at the bus clock rate during the second data transfer.

2. The method of claim 1 wherein the step of pre-driving one of the first and second strobe signals pre-drives the first strobe signal if said idle interval is equal to or larger than two clock cycles of said bus clock.

3. The method of claim 1 wherein the step of pre-driving one of the first and second strobe signals pre-drives the second strobe signal if said idle interval is less than two clock cycles of said bus clock.

4. The method of claim I wherein said first data transfer is requested by a first bus agent and the second data transfer is requested by a second bus agent.

5. The method of claim 4 wherein said idle interval is caused by a changeover of mastership between said first and second bus agents.

6. A computer system comprising:

a bus having a bus clock, said bus comprising a data bus, said bus providing a first strobe signal and a second strobe signal, the first and second strobe signals clocking data in first and second data transfers, respectively;

a first bus agent coupled to said bus for initiating the first data transfer, said first data transfer being pre-driven by said first strobe signal;

a second bus agent coupled to said bus for initiating the second data transfer, said second data transfer being pre-driven by one of said first and second strobe signals during an idle interval between said first and second data transfers.

7. The computer system of claim 6 wherein said second data transfer is pre-driven by the first strobe signal if said idle interval is equal to or larger than two clock cycles of said bus clock.

8. The computer system of claim 6 wherein said second data transfer is pre-driven by the second strobe signal if said idle interval is less than two clock cycles of said bus clock.

* * * * *